United States Patent
Qu et al.

(10) Patent No.: US 9,367,696 B2
(45) Date of Patent: Jun. 14, 2016

(54) INTEROPERABILITY BETWEEN A PLURALITY OF DATA PROTECTION SYSTEMS

(75) Inventors: Jin Qu, Shanghai (CN); Milan Petkovic, Eindhoven (NL); Changjie Wang, Shanghai (CN); Muhammad Asim, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 60 days.

(21) Appl. No.: 13/805,911

(22) PCT Filed: May 30, 2011

(86) PCT No.: PCT/IB2011/052362
§ 371 (c)(1),
(2), (4) Date: Dec. 20, 2012

(87) PCT Pub. No.: WO2011/161565
PCT Pub. Date: Dec. 29, 2011

(65) Prior Publication Data
US 2013/0104244 A1    Apr. 25, 2013

(30) Foreign Application Priority Data
Jun. 23, 2010  (WO) ................ PCT/CN2010/074311

(51) Int. Cl.
*G06F 21/60* (2013.01)
*G06F 21/62* (2013.01)

(52) U.S. Cl.
CPC ............ *G06F 21/60* (2013.01); *G06F 21/6236* (2013.01)

(58) Field of Classification Search
CPC ...................................... G06F 21/60
USPC ............................................................. 726/26
See application file for complete search history.

(56) References Cited

U.S. PATENT DOCUMENTS

| | | | |
|---|---|---|---|
| 7,930,197 B2* | 4/2011 | Ozzie et al. .................. | 705/7.11 |
| 2007/0097959 A1* | 5/2007 | Taylor ............................ | 370/352 |

(Continued)

FOREIGN PATENT DOCUMENTS

EP    1895439 A1    3/2008

OTHER PUBLICATIONS

Eva Rodriguez, DRM and Access Control architectures interoperability, Sep. 12, 2008, p. 447-450, E-08034 Barcelona, Spain.*

(Continued)

*Primary Examiner* — Teshome Hailu
*Assistant Examiner* — Thanh Le

(57) ABSTRACT

A system is disclosed for providing interoperability between a plurality of data protection systems. The system includes an ontology (3) configured to store definitions (12) of concepts (4) relating to interface elements of at least two different data protection systems including a first data protection system (1) and a second data protection system (2); and a mapping generator (5) configured to generate a mapping between at least one interface element of the first data protection system (1) and at least one interface element of the second data protection system (2), based on the ontology (3). The system comprises a message converter (16) configured to receive a message generated by the first data protection system (1), convert the message based on the mapping to obtain a converted message, and transmit the converted message to the second data protection system (2).

17 Claims, 3 Drawing Sheets

(56) References Cited

U.S. PATENT DOCUMENTS

2008/0189250 A1* 8/2008 Cha et al. .................... 707/3
2011/0087670 A1* 4/2011 Jorstad et al. ................ 707/741

OTHER PUBLICATIONS

Asim, An interoperable security framwork for connected heathcare, Jan. 9, 2011, 7th IEEE International Workshop on Digitals Rights Managerment Impact on consumer communications (DRM 2011).*

Taban et al., "Towards a Secure and Interoperable DRM Architecture" DRM, Oct. 30, 2006, pp. 69-78.

Eshuis et al., "Structural Matching of BPEL Processes", Proceedings of the Fifth European Conference on Web Services, 2007, pp. 171-180.

Hwang et al., "Interoperable DRM Framework for Multiple Devices Environment", ETRI Journal, vol. 30, No. 4, Aug. 2008, pp. 565-575.

"DRM and Access Control Architectures Interoperability", Downloaded From Visnet Wiki on Jan. 6, 2010, pp. 1-4.

Rodriguez et al., "DRM and Access Control Architectures Interoperability", 50th International Symposium Elmar, Sep. 12, 2008, pp. 447-450.

Ontology (Informationscience) From Wikipedia, Retrieved From the Internet: URL:http://en.wikipedia.org/w/index.php?title=ontology_%28information_science%29oldid=364869097, May 29, 2010, pp. 1-9.

Asim et al., "An Interoperable Security Framework for Connected Healthcare" Comsumer Communications and Networking Converence, IEEE, Jan. 9, 2011, pp. 116-120.

Nakatsuji, M. et al. "Proposal of Ontology Mapping Technology and Applying the Network Management System", The Institute of Electronics, Information and Communication Engineers, Technical Report of IEICE, 2013.

Van Damme, C. et al. "Folksontology: An Integrated approach for turning folksonomies into ontologies", (2007) http://www.heppnetz.de/files/vandammeheppsiorpaes-folksontology-semnet2007-crc p . . . .

* cited by examiner

INTEROPERABILITY BETWEEN A PLURALITY OF DATA PROTECTION SYSTEMS

FIELD OF THE INVENTION

The invention relates to interoperability between a plurality of data protection systems.

BACKGROUND OF THE INVENTION

An electronic health record (EHR) is a repository for electronically stored data related to patient's health status and health care. An EHR System can provide functions to improve the quality and the efficiency of health-care delivery. There is an increasing demand for personal healthcare services such as remote patient monitoring. To enable such services, health data may be communicated to and from a patient's home. Health-related data is generally considered as private, which justifies the existence of legislation and well-established ethical principles such as Hippocratic Oath. To enable use of digital health data at home and sharing with third parties outside the hospital, the future healthcare infrastructure needs additional protection mechanisms that go beyond traditional access control.

Traditional security mechanisms provide an online centralized secure access solution for protection of sensitive health data. This solution fits well in the traditional centralized architecture of the healthcare infrastructures. However, the modern healthcare infrastructure is of a decentralized nature and the sensitive health data is frequently shared with different parties belonging to different security domains. Digital rights management (DRM) provides a solution to fulfill these additional needs of modern healthcare infrastructure. However, the DRM system should be interoperable with the access control system as these systems may be deployed in parallel.

"DRM and Access Control architectures interoperability" by Eva Rodríguez et al., at 50th International Symposium ELMAR-2008, 10-12 Sep. 2008, Zadar, Croatia, vol. 2, pp. 447-450, discloses a DRM architecture and an access control framework (ACF) architecture. The DRM architecture manages access by users to resources. A 'broker' provides interoperability between DRM and ACF access control rules, between digital objects and digital media, and between protection information associated to digital resources of both systems.

SUMMARY OF THE INVENTION

It would be advantageous to have an improved interoperability between a plurality of data protection systems. To better address this concern, in a first aspect, the invention provides a system, comprising:

an ontology configured to store definitions of concepts relating to interface elements of at least two different data protection systems including a first data protection system and a second data protection system; and a mapping generator configured to generate a mapping between at least one interface element of the first data protection system and at least one interface element of the second data protection system, based on the ontology.

The ontology and the mapping generator thus provide interoperability by mapping the interface elements. The ontology makes the interoperability system flexible, because the mappings do not have to be pre-programmed manually. Instead, the definitions of the concepts of the data protection systems are provided in the ontology, and the mapping generator generates the mapping based on the ontology. This way, new concepts can be easily handled by providing definitions of the new concepts.

The system may comprise a message converter configured to receive a message generated by the first data protection system, convert the message based on the mapping to obtain a converted message, and transmit the converted message to the second data protection system. This shows the use of the mapping.

The first data protection system may comprise an access control system and the second data protection system may comprise a digital rights management system. The system then provides interoperability between an access control system and a DRM system, because it makes it possible to understand both AC and DRM system requests and responses. The ontology allows to make the interface more flexible, because mappings between interface elements of the DRM system and access control system do not have to be pre-programmed. For example, when a new DRM system needs to be supported, the definitions of concepts relating to interface elements of the new DRM system may be provided to the mapping generator, which generates the mapping by looking up corresponding concepts relating to one or more interface elements of the access control system.

The mapping generator may be arranged for mapping between an access control policy and a digital rights management license. The flexibility of the ontology facilitates mapping between a policy and a license.

The access control system may comprise an access control server and the digital rights management system may comprise a digital rights management client. The mapping generator may be configured to generate a mapping between at least one interface element of the access control server and at least one interface element of the digital rights management client, based on the ontology. This way, the digital rights management client may work with an access control based server, for example the digital rights management client may request data from the access control based server.

The mapping generator may be arranged for generating the mapping based on the definitions of the concepts. This is a flexible way of generating the mapping without having to explicitly define the mapping beforehand.

The ontology may be arranged for storing representations of relationships between the concepts of the different data protection systems, and the mapping generator may be arranged for generating the mapping based on the relationships between the concepts defined in the ontology. This is an efficient way of generating the mapping. For example, after a mapping has been generated based on the definitions, the mapping may be stored as a relationship to make future mappings less computationally expensive.

The mapping generator may be arranged for matching a definition of a concept of a first data protection system with at least one definition of a concept of a second data protection system. By matching the concepts by their definitions, the mapping can be made dynamically. Only the definitions are needed to provide interoperability. Moreover, by allowing one concept to be matched with more than one other concept, the mappings can be made more advanced, because one interface element may be mapped to a plurality of interface elements of the other system. This improves the interoperability in case the interface elements in the several systems do not have the same semantics. The vocabularies may describe, inter alia, the interface elements of the DRM and/or access control systems.

The mapping generator may be arranged for mapping an interface element of the access control system at least partly into a system constraint of a digital rights management system. It may not be possible to express the full semantics of an interface element of the access control system in interface elements of the digital rights management system, because such systems are inherently different. Such concepts may be translated into system constraints of the digital rights management system. These constraints may relate to, for example, use of a secure clock, region, or operating system.

The system may comprise an ontology updater for including a definition of a new interface element in the ontology. This way, the ontology is extended with the new interface element, and the mapping generator can start generating mappings for the new interface element.

The ontology updater may be arranged for extracting a relationship between the new interface element and an existing interface element, based on the definitions, and storing the relationship in the ontology. This allows to quickly map the new interface element with the existing interface element after the relationship has been stored.

The mapping generator may be arranged for generating mappings for concepts of a plurality of different digital rights management systems based on different digital rights management standards. This way, multiple digital rights management systems can be supported for accessing data of an access control system.

The system may be incorporated in a workstation.

In another aspect, the invention provides a method of providing an interface between an access control system and a digital rights management system, comprising:

storing definitions of concepts in an ontology, the concepts relating to the interface elements of the digital rights management system and/or the access control system, and generating a mapping between interface elements of a digital rights management system and interface elements of an access control system, based on the definitions in the ontology.

In another aspect, the invention provides a computer program product comprising instructions for causing a processor system to perform the method set forth.

It will be appreciated by those skilled in the art that two or more of the above-mentioned embodiments, implementations, and/or aspects of the invention may be combined in any way deemed useful.

Modifications and variations of the workstation, the method, and/or the computer program product, which correspond to the described modifications and variations of the system, can be carried out by a person skilled in the art on the basis of the present description.

BRIEF DESCRIPTION OF THE DRAWINGS

These and other aspects of the invention are apparent from and will be elucidated with reference to the embodiments described hereinafter. In the drawings.

DETAILED DESCRIPTION OF EMBODIMENTS

Figure 1:
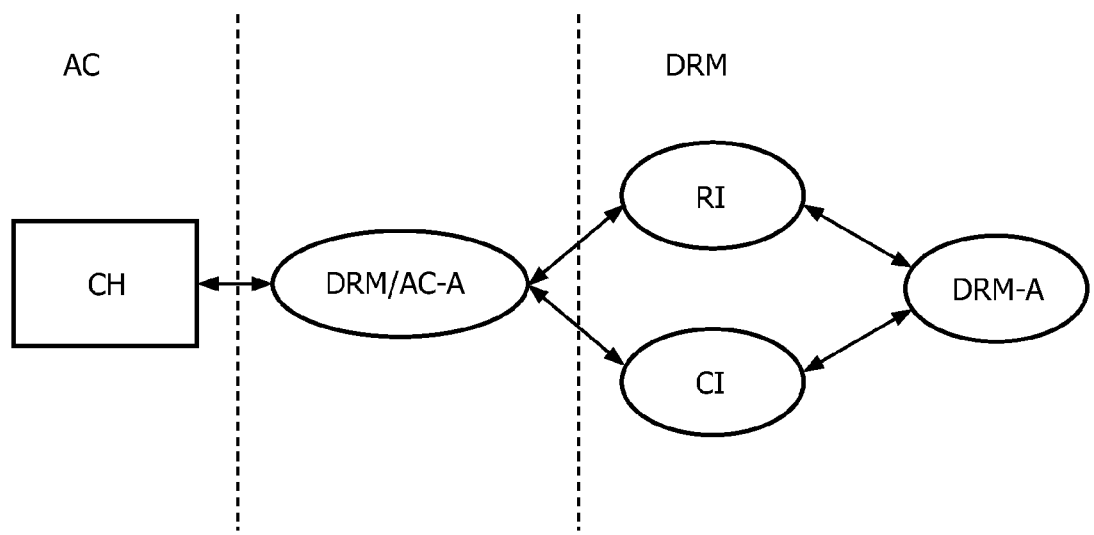
FIG. 1 is a diagram of a system comprising access control and DRM components.

A high level architecture of an example of a system for interoperability between a digital rights management (DRM) system and an access control (AC) system is shown in FIG. 1. The DRM/AC Agent (DRM/AC-A) acts as an interface between the DRM system and the AC system. The DRM system may include a rights issuer (RI), a content issuer (CI) and a DRM agent (DRM-A). The AC system may comprise a content handler (CH). Functions of the DRM/AC agent as shown in FIG. 1 may include: 1) translation of requests from the DRM system into a request to a context handler (CH) of the AC system, such as a XACML PEP request; this request is then forwarded to the context handler CH of the AC system or alternatively to XACML PEP (not shown), which may then forward it to the context handler; 2) the reception of the decision from the AC system (which may also include requested content); 3) preparation of the related rights (or permissions) information for a rights issuer RI of the DRM system; 4) optionally sending the requested content to the content issuer CI of the DRM system.

An application of the techniques described herein is the DRM/AC agent which interfaces between Context Handler and DRM system and on the realization of the functions of the DRM/AC agent. The DRM system and the AC system may share the same user identity management system. Alternatively, a translation service may be provided to translate the DRM user ID into the AC system user ID or vice versa.

Figure 2:
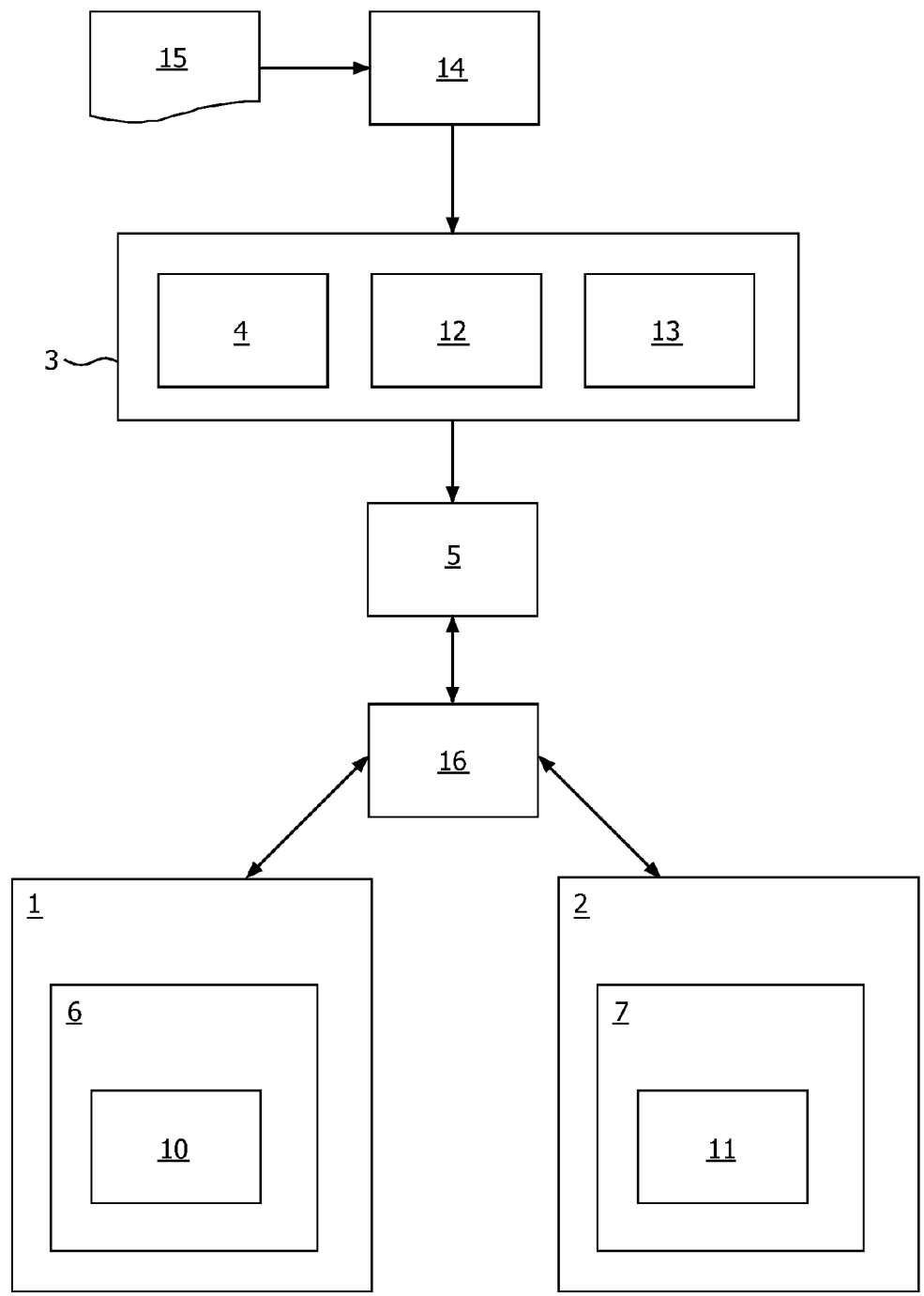
FIG. 2 is a block diagram showing aspects of a system for providing interoperability between a plurality of data protection systems.

More generally, FIG. 2 shows a block diagram of a system for providing interoperability between a plurality of data protection systems. The figure shows two data protection systems 1 and 2, however this is not a limitation. The system may provide support for more than two data protection systems. The system may comprise an ontology 3 configured to store definitions 12 of concepts 4 relating to interface elements of the at least two different data protection systems 1, 2. Moreover, the system may comprise a mapping generator 5 configured to generate a mapping between at least one interface element of the first data protection system 1 and at least one interface element of the second data protection system 2, based on the ontology 3. Herein, an interface element may comprise a part of a message which is produced by the system or is accepted by the system as input. These interface elements are usually described in a manual of a standard on which the data protection system is based.

The system may further comprise a message converter 16 configured to receive a message generated by the first data protection system 1, convert the message based on the mapping to obtain a converted message, and transmit the converted message to the second data protection system 2. More mappings may be used to convert a single message, because a message may comprise several fields which may be seen as interface elements for which separate concepts may be defined.

The first data protection system 1 may comprise an access control system 6, and the second data protection system 2 may comprise a digital rights management system 7. Thus, the concepts and definitions may relate to the interface elements of these systems. In a particular example, the mapping generator 5 is arranged for mapping between an access control policy and a digital rights management license. Multiple concepts and definitions may be involved in a single access control policy or digital rights management license. The mapping generator maps the concepts needed to convert an access control policy into a digital rights management license.

The access control system 6 may comprise an access control server 10. The digital rights management system 7 may comprise a digital rights management client 11. The digital rights management client 11 normally would communicate with a digital rights management server (not shown), in order to request licenses and content. In the present case, as shown in FIG. 2, the request issued by the digital rights management client 11 is received by the mapping generator. The mapping generator comprises a message converter (not shown) which applies the mapping generated by the mapping generator to convert the message from the DRM client 10 into a message which is compatible with access control server 11. To support this, the mapping generator 5 may be configured to generate a mapping between at least one interface element of the access control server 10 and at least one interface element of the digital rights management client 11, based on the ontology 3.

The mapping generator 5 may be arranged for generating the mapping based on the definitions 12 of the concepts 4.

The ontology 3 may be arranged for storing representations of relationships 13 between the concepts 4 of the different data protection systems 1, 2. The mapping generator 5 may generate the mapping based on these relationships 13 between the concepts 4 defined in the ontology 3. For example, a relationship may be that two concepts have a similar semantics; the mapping generator would then map the interface elements representing these concepts to each other.

The mapping generator 5 may be arranged for matching a definition 12 of a concept 4 of the first data protection system 1 with at least one definition 12 of a concept 4 of the second data protection system 2. For example, an inference engine may be used for this purpose. When the semantics of a concept 4 of the first data protection system as represented by the definition 12 corresponds to the semantics of a concept 4 of the second data protection system, these concepts may be mapped. Alternatively, when the semantics of a concept 4 of the first data protection system 1 corresponds to the semantics of two or more concepts 4 of the second data protection system 2, the concept 4 of the first data protection system 1 may be mapped to these two or more concepts of the second data protection system 2.

The mapping generator 5 is arranged for mapping an interface element of the access control system 6 at least partly into a system constraint of a digital rights management system 7. Examples of such constraints are explained elsewhere in this description.

The system may further comprise an ontology updater 14 for including a concept and definition 15 of a new interface element in the ontology 3. The interface element is 'new' in the sense that it is not yet represented in the ontology 3. The new interface element may be used to generate mappings. This way, extensions to a data protection system 1, 2 may be easily included in the interoperability system. Moreover, support for an entirely different data protection system may be added to the ontology. To this end, a new vocabulary may be created in the ontology 3, or the new interface elements/concepts may be associated with a particular data protection system in the ontology 3.

The ontology updater 14 may be arranged for determining a relationship 13 between the new interface element and an existing interface element, based on the definitions 12, and storing the relationship in the ontology 3. This way, the relationships can be used to generate mappings more efficiently by the mapping generator 5.

The mapping generator 5 may be arranged for generating mappings for concepts 4 of a plurality of different digital rights management systems based on different digital rights management standards. As described above, the individual concepts in the ontology may be associated with a particular digital rights management standard. Consequently, the mapping generator can create a mapping from a concept of a first data protection system 1 to any other data protection system for which the relevant definitions and/or relationships are included in the ontology.

The system may be implemented on a workstation.

Figure 3:
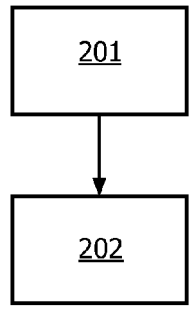
FIG. 3 is a flowchart showing aspects of a method of providing interoperability between a plurality of data protection systems.

FIG. 3 illustrates a method of providing interoperability between a plurality of data protection systems. The method comprises step 201 of storing definitions of concepts relating to interface elements of at least two different data protection systems including a first data protection system and a second data protection system. The method further comprises step 202 of generating a mapping between at least one interface element of the first data protection system and at least one interface element of the second data protection system, based on the ontology. The method may be extended or modified based on the description of the functionalities of the system. The method may be implemented by means of a computer program product comprising instructions for causing a processor system to perform the method.

The ontology may comprise at least one definition expressed in a process definition language. The process definition language is a suitable language, because it is convenient to express permissions in such a process definition language. This is based on the insight that permissions often relate to one or more actions, for example a sequence of actions, which may be performed with a particular data item.

In the following embodiment it is shown how the automatic mapping between vocabularies of the two different languages used in two different data protection systems can be created by the DRM/AC agent using the knowledge base (ontology), which may be expressed using different formal methods, such as description logic (e.g. OWL). Concepts may be defined formally so that they can be automatically classified (using existing reasoners/classifiers) in taxonomy. In this way the terms from a new language can be automatically added to the taxonomy of an existing ontology based on their formal definitions.

The knowledge base referenced by the DRM/AC agent (or inference engine) may comprise formal definitions of the concepts (ontology classes) including already established relationship between the concepts from different vocabularies (permissions as defined by different languages) and definitions of the HL7 vocabulary also formally described using description logic (DL), or other formal logics.

In this embodiment, a few examples are described of formal description of permissions (operations) in access control and DRM languages. As already mentioned, the concepts (classes) in the ontology may be formalized using DL (languages such as OWL) or other formal logics. However, as the permissions used in a data protection system may correspond to operations and may be defined as verbs—words which convey action, they can be formalized efficiently using formal methods for description of processes namely BPEL (Business Process Execution Language). Similar formalisms such as process algebra, Petri Nets or BPMN, as well as other formal logics can also be used. Use of a process description language is not a limitation.

Conventionally BPEL has been used for specifying business process behavior based on web services. It is based on XML. However, BPEL is may be used here to represent the definitions of the permission vocabulary as a process such that it can then be used by the inference engine to establish new relationships. Using BPEL the permissions (operations/actions) can be visualized as a process. The inference engine could then compare the BPEL processes using different process matching techniques.

Figure 4A:
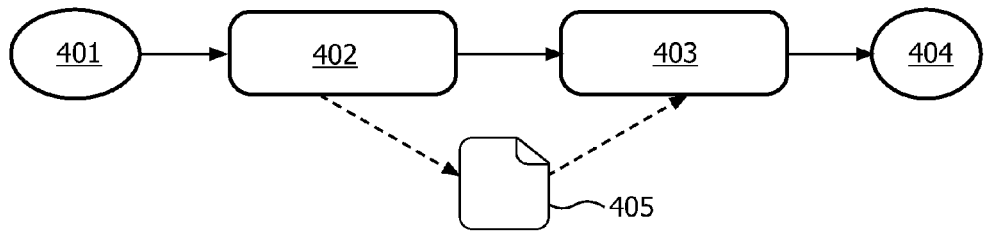
FIGS. 4A, B and C show pictorial representations of several permission definitions.
Figure 4B:
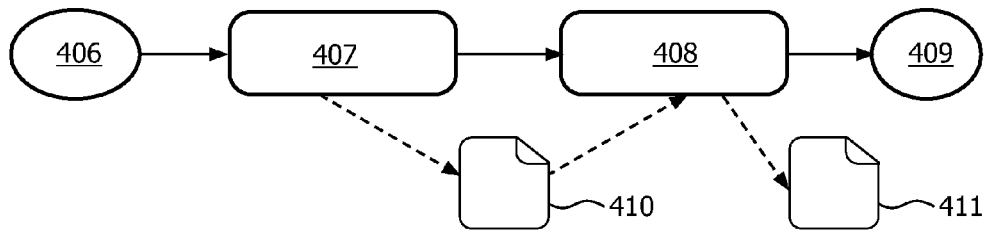
Figure 4C:
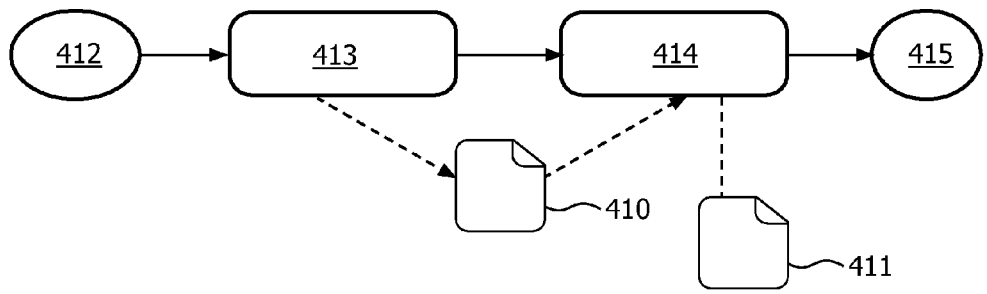

FIG. 2 shows the pictorial representation of the definitions of a few permissions expressed as a process using BPMN (Business Process Modeling Notation) notations which could then be easily mapped to BPEL. In particular, FIG. 4A shows a pictorial representation of the definition of permission "read": start 401; processing device renders the file 405 in block 402; a visual device presents the file in block 403; and end 404. FIG. 4B shows a pictorial representation of the definition of the permission "print": start 406; the processing device renders the file 410 in block 407; the printing device makes a hardcopy 411 in block 408; end 409. FIG. 4C shows a pictorial representation of the definition of permission "reproduce or copy": start 412; a first storage device processes the file and produces file 410 in block 413; a second storage device receives the file 410 stores it as file 411 in block 414; end 415.

In the following example steps are described which may be performed by e.g. the ontology updater 14 when a new term is added.

1. In the first step, the DRM/AC agent receives new terms (e.g. permissions from a new AC or DRM language), as well as with their definitions expressed in a process description form using BPEL or in another language.
2. In the second step, the new ontology terms are provided to the inference engine.
3. In the third step, the inference engine consults the knowledge base and retrieves the definitions of the existing ontology including the central vocabulary that are being expressed in BPEL.
4. In the fourth step, the inference engine compares the new ontology terms with the existing ontology. This step may be performed in a way similar to BPEL process matching, in particular when the definitions are expressed in BPEL. The matching could be performed in a number of ways. One way of comparing the processes is disclosed in R. Eshuis, P. Grefen, "Structural Matching of BPEL Processes", Proceedings of the Fifth European Conference on Web Services, pp: 171-180, 2007. In this cited paper, the two processes are equivalent if the type of the process is the same and consists of the same activities. As a result of a successful matching, the inference engine may update the knowledge base by creating a new mapping relationship.

It will be appreciated that the invention also applies to computer programs, particularly computer programs on or in a carrier, adapted to put the invention into practice. The program may be in the form of a source code, an object code, a code intermediate source and an object code such as in a partially compiled form, or in any other form suitable for use in the implementation of the method according to the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing step of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a storage medium, such as a ROM, for example, a CD ROM or a semiconductor ROM, or a magnetic recording medium, for example, a floppy disc or a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for providing interoperability between a plurality of digital data protection systems, comprising:
    ontology storage that stores an ontology including definitions of concepts relating to interface elements of at least two different digital data protection systems including a first data protection system with an access control server and a second data protection system with a digital rights management client, wherein the concepts include data to convert a policy of the second data protection system into a license of the first data protection system;
    a computer processor that generates a mapping between at least one interface element of the first data protection system and at least one interface element of the second data protection system, based on the ontology, wherein the mapping maps the concepts that convert the policy of the second protection system into the license of the first data protection system; and
    a message converter, wherein the digital rights management client issues a first request for data from the access control server, the message converter converts the request from the digital rights management client to a second different request to the access control server based on the mapping, the second different request is forwarded to and received by the access control server, and the access control server sends the requested content to the digital rights management client.

2. The system according to claim 1, comprising a message converter configured to receive a message generated by the first data protection system, convert the message based on the mapping to obtain a converted message, and transmit the converted message to the second data protection system.

3. The system according to claim 1, wherein the policy is an access control policy and the license is a digital rights management license.

4. The system according to claim 1, wherein the mapping generator is arranged for generating the mapping based on the definitions of the concepts.

5. The system according to claim 4, wherein the mapping generator is arranged for matching a definition of a concept of the first data protection system with at least one definition of a concept of the second data protection system.

6. The system according to claim 1, wherein the ontology is arranged for storing representations of relationships between the concepts of the different data protection systems, and wherein the mapping generator is arranged for generating the mapping based on the relationships between the concepts defined in the ontology.

7. The system according to claim 1, wherein the mapping generator is arranged for mapping an interface element of the access control system at least partly into a system constraint of a digital rights management system.

8. The system according to claim 1, further comprising an ontology updater for including a concept and definition of a new interface element in the ontology.

9. The system according to claim 8, wherein the ontology updater is arranged for determining a relationship between the new interface element and an existing interface element, based on the definitions, and storing the relationship in the ontology.

10. The system according to claim 8, wherein the ontology updater is arranged for extracting a relationship between the new interface element and an existing interface element, based on the definitions, and storing the relationship in the ontology.

11. The system according to claim 1, wherein the mapping generator is arranged for generating mappings for concepts of a plurality of different digital rights management systems based on different digital rights management standards.

12. The system according to claim 1, wherein the at least one of the least one interface element of the first data protection system comprises a part of a first message or the at least one interface element of the second data protection system comprises a part of a second message and the definitions of concepts include vocabularies.

13. The system according to claim 1, wherein the ontology stores representations of relationships between the concepts of the different data protection systems, a relationship of the relationships includes two concepts with similar semantics, and the mapping generator generates the mapping between the concepts defined in the ontology by mapping the interface elements representing these concepts to each other.

14. The system according to claim 1, wherein mappings between interface elements of a DRM system and an access control system are not pre-programmed mappings.

15. The system according to claim 1, wherein the computer processor generates the mapping by looking up corresponding concepts relating to one or more interface elements of the access control system.

16. A computer-implemented method of providing interoperability between a plurality of digital data protection systems, comprising:
  storing definitions of concepts in an ontology, the concepts relating to interface elements of at least two different digital data protection systems including a first data protection system with an access control server and a second data protection system with a digital rights management client, wherein the concepts include data to convert the policy of the second data protection system into a license of the first data protection system;
  generating a mapping between at least one interface element of the first data protection system and at least one interface element of the second data protection system, based on the ontology, wherein the mapping maps the concepts that convert the policy of the second protection system into the license of the first data protection system;
  issuing, with the digital rights management client, a first requests for data from the access control server;
  converting, with a message converter, the requests from the digital rights management client to a second different request to the access control server based on the mapping; and
  forwarding the second different request to the access control server, wherein the access control server receives the second different request and sends the requested content to the digital rights management client, which receives the sent requested content.

17. A non-transitory computer readable medium encoded with software, which, when executed by a computer processor, causes the computer processor to:
  store definitions of concepts in an ontology, the concepts relating to interface elements of at least two different digital data protection systems including a first data protection system with an access control server and a second data protection system with a digital rights management client, wherein the concepts include data to convert the policy of the second data protection system into a license of the first data protection system; and
  generate a mapping between at least one interface element of the first data protection system and at least one interface element of the second data protection system, based on the ontology, wherein the mapping maps the concepts that convert the policy of the second protection system into the license of the first data protection system;
  receive, with the access control server, a converted request, wherein the converted request is generated by a message converter, which converts an initial request issued by the digital rights management client for data from the access control server to the converted request and forwards the converted request to the access control server, and wherein the access control server sends the requested content to the digital rights management client.

* * * * *